(12) United States Patent
Burgod et al.

(10) Patent No.: US 11,920,589 B2
(45) Date of Patent: Mar. 5, 2024

(54) SCROLL COMPRESSOR INCLUDING AN ELECTRICAL BOX CONTAINING A WIRE GUIDING PART

(71) Applicant: Danfoss Commercial Compressors, Trevoux (FR)

(72) Inventors: Jerome Burgod, Reyrieux (FR); Guillaume Rochet, Nordborg (DK)

(73) Assignee: Danfoss Commercial Compressors, Trevoux (FR)

( * ) Notice: Subject to any disclaimer, the term of this patent is extended or adjusted under 35 U.S.C. 154(b) by 23 days.

(21) Appl. No.: 17/545,564

(22) Filed: Dec. 8, 2021

(65) Prior Publication Data
US 2022/0282729 A1 Sep. 8, 2022

(30) Foreign Application Priority Data
Mar. 8, 2021 (FR) .................................. 21/02215

(51) Int. Cl.
*F04C 2/02* (2006.01)
*F04C 15/00* (2006.01)
(Continued)

(52) U.S. Cl.
CPC .......... *F04C 18/0215* (2013.01); *F04C 2/025* (2013.01); *F04C 15/00* (2013.01);
(Continued)

(58) Field of Classification Search
CPC ........ F04C 2/025; F04C 18/0207–0292; F04C 2240/803; F01C 1/0207–0292; H01R 9/2416
See application file for complete search history.

(56) References Cited

U.S. PATENT DOCUMENTS

| | | | |
|---|---|---|---|
| 6,354,878 B1* | 3/2002 | Kropa ................ | H01R 13/5816 439/607.41 |
| 2005/0196285 A1* | 9/2005 | Jayanth .................... | H02H 3/08 417/410.5 |

(Continued)

FOREIGN PATENT DOCUMENTS

| | | | |
|---|---|---|---|
| DE | 1140252 B | * | 11/1962 |
| EP | 3660307 A1 | | 6/2020 |

(Continued)

*Primary Examiner* — Laert Dounis
(74) *Attorney, Agent, or Firm* — McCormick, Paulding & Huber PLLC

(57) ABSTRACT

The scroll compressor (1) includes a hermetic casing (2); an electric motor (12) arranged within the hermetic casing (2); an electrical box (14) attached to an outer surface of the hermetic casing (2); and compressor power terminals (13) insulated from the hermetic casing (2) and electrically connected to the electric motor (12), the compressor power terminals (13) protruding in the electrical box (14), the electrical box (14)] containing a control module (15) configured to control the electric motor (12), control wires (16) connected to the control module (15), and a terminal block assembly (17) configured to electrically connect the compressor power terminals (13) and the control wires (16) to external power leads (18) of an external power source. The terminal block assembly (17) includes a body part (19) and a wire guiding part (21) which is configured to guide and position the control wires (16) in predetermined connection positions with respect to the body part (19).

22 Claims, 5 Drawing Sheets

(51) Int. Cl.
*F04C 18/02* (2006.01)
*F04C 23/00* (2006.01)
*H01R 4/34* (2006.01)
*H01R 9/24* (2006.01)
*H01R 13/58* (2006.01)
*H01R 43/20* (2006.01)
*H02G 3/16* (2006.01)

(52) U.S. Cl.
CPC ......... *F04C 23/008* (2013.01); *H01R 9/2416* (2013.01); *H02G 3/16* (2013.01); *F04C 2230/60* (2013.01); *F04C 2240/30* (2013.01); *F04C 2240/40* (2013.01); *F04C 2240/803* (2013.01); *H01R 4/34* (2013.01); *H01R 13/5833* (2013.01); *H01R 43/20* (2013.01)

(56) References Cited

U.S. PATENT DOCUMENTS

| | | |
|---|---|---|
| 2009/0185921 A1 | 7/2009 | Beagle et al. |
| 2013/0196528 A1* | 8/2013 | Kolkman ................ F04B 27/08 439/345 |
| 2013/0251549 A1* | 9/2013 | Rogalski ............... F04C 23/008 417/313 |
| 2015/0023820 A1 | 1/2015 | Rogalski |

FOREIGN PATENT DOCUMENTS

| | | |
|---|---|---|
| FR | 3065838 A1 | 11/2018 |
| JP | 2003303643 A * | 10/2003 |
| WO | WO-2019216834 A1 * | 11/2019 |

\* cited by examiner

[Fig 1]
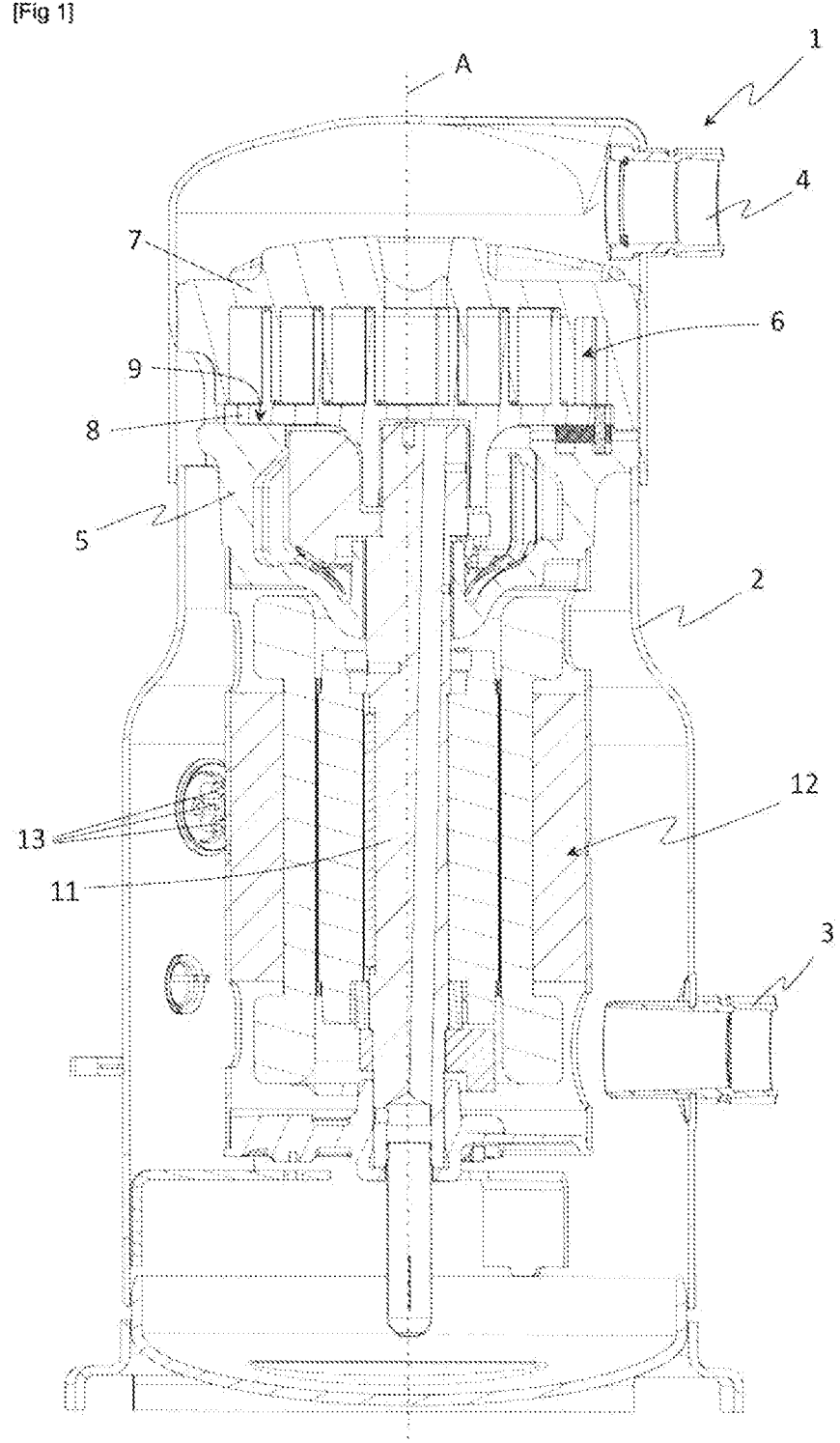

[Fig 2]
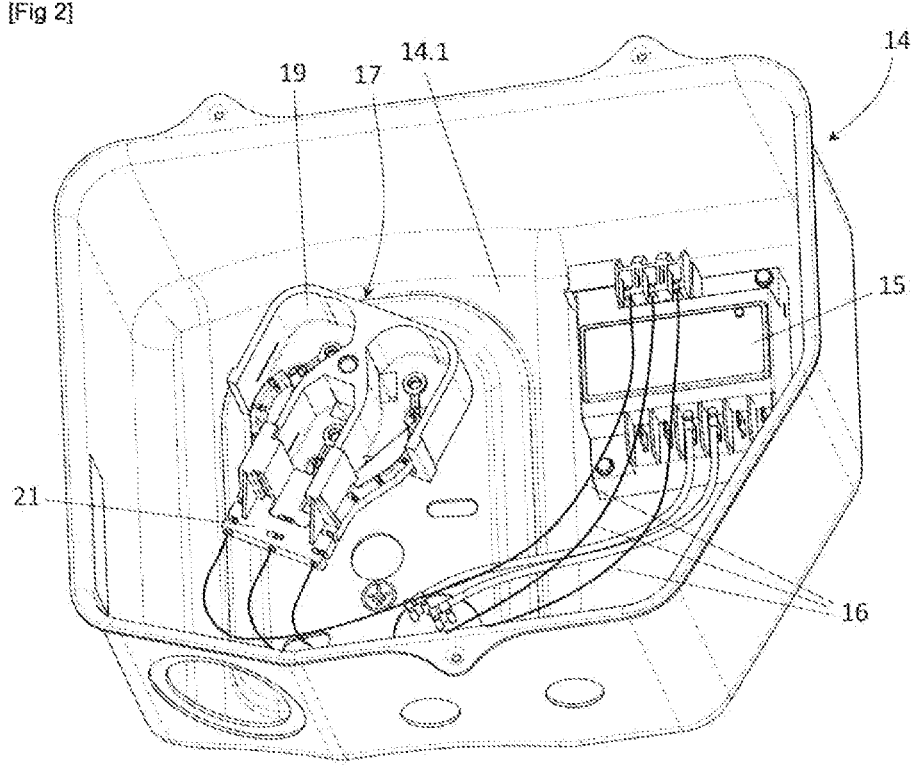
[Fig 3]
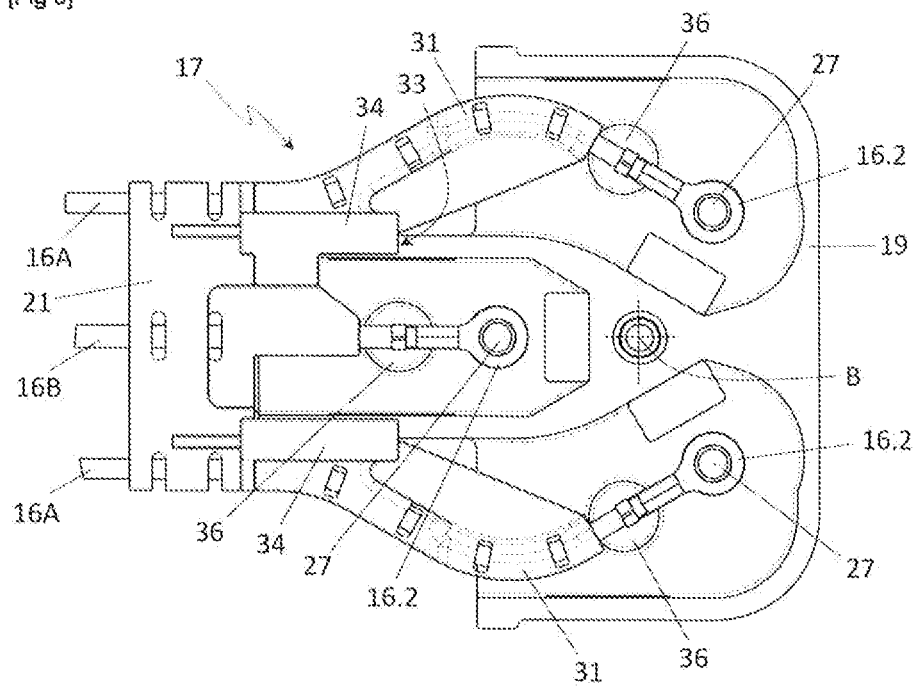

[Fig 4]
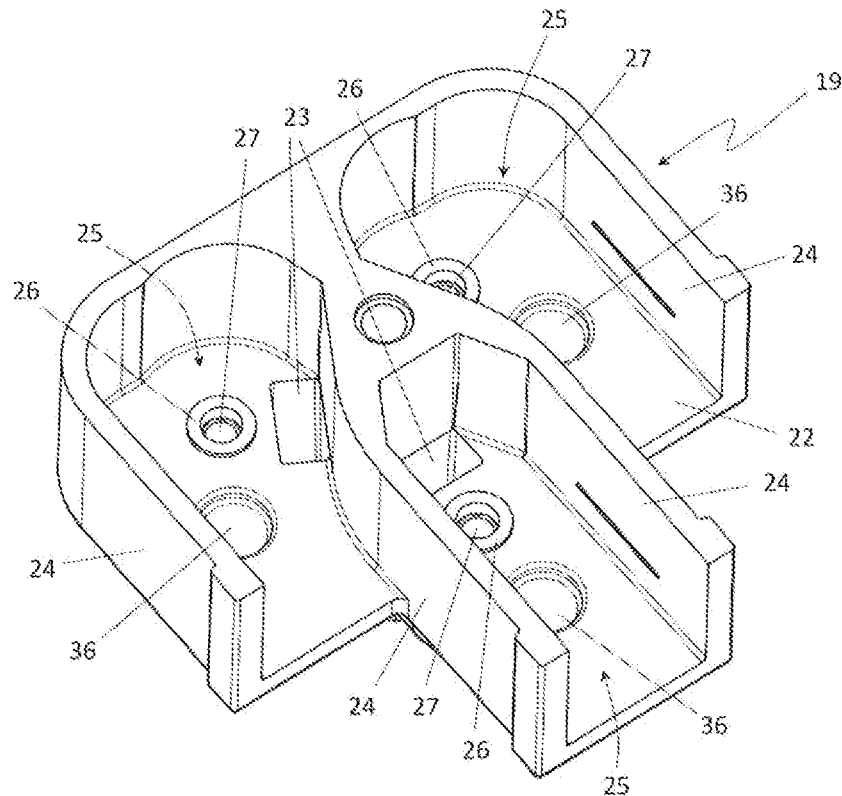
[Fig 5]
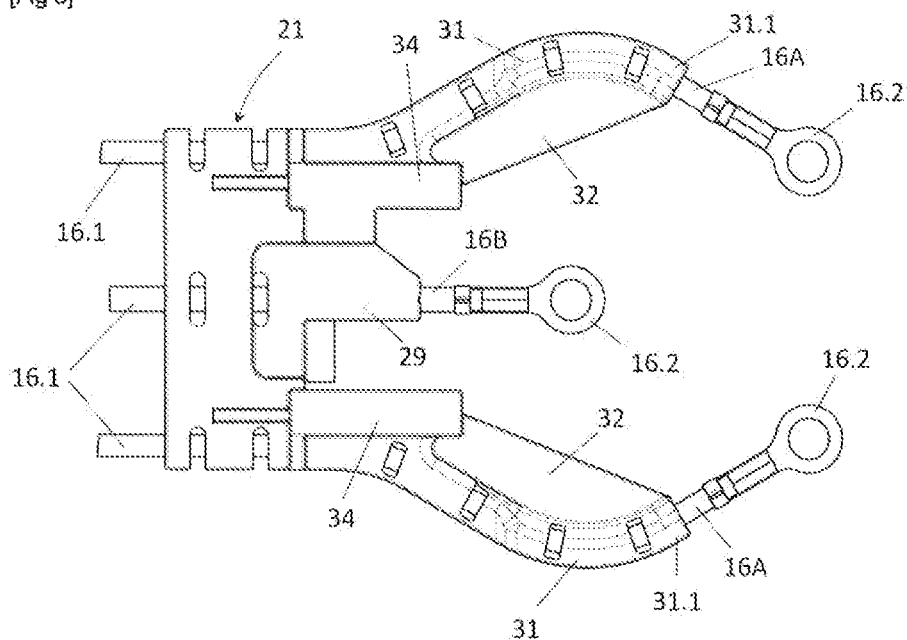

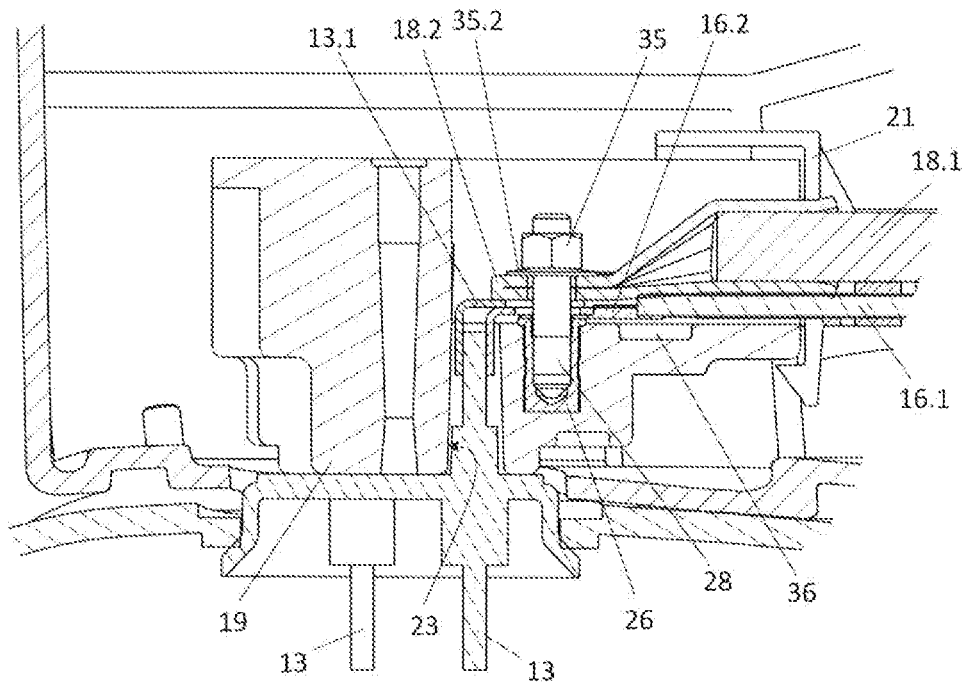
[Fig 6]
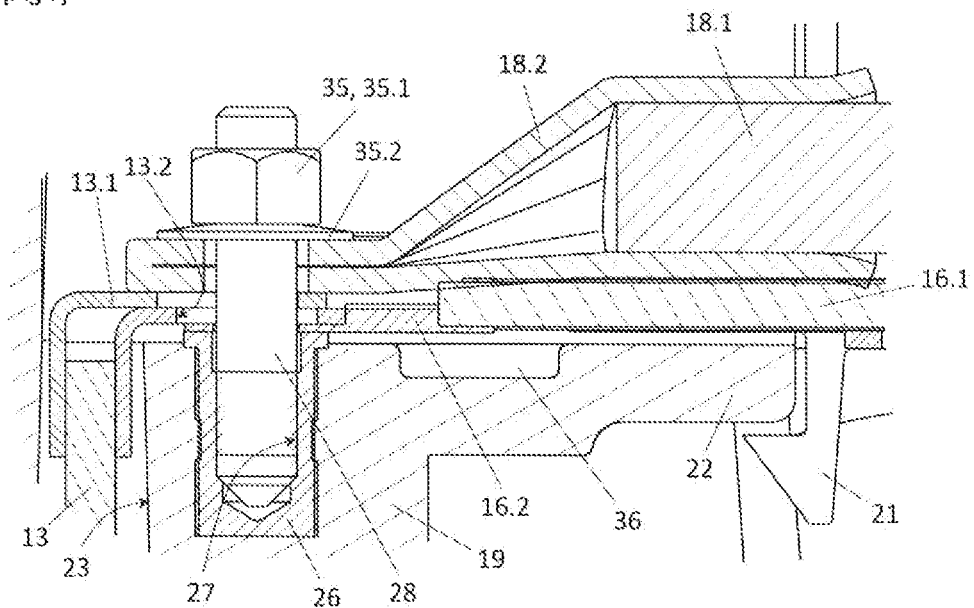
[Fig 7]

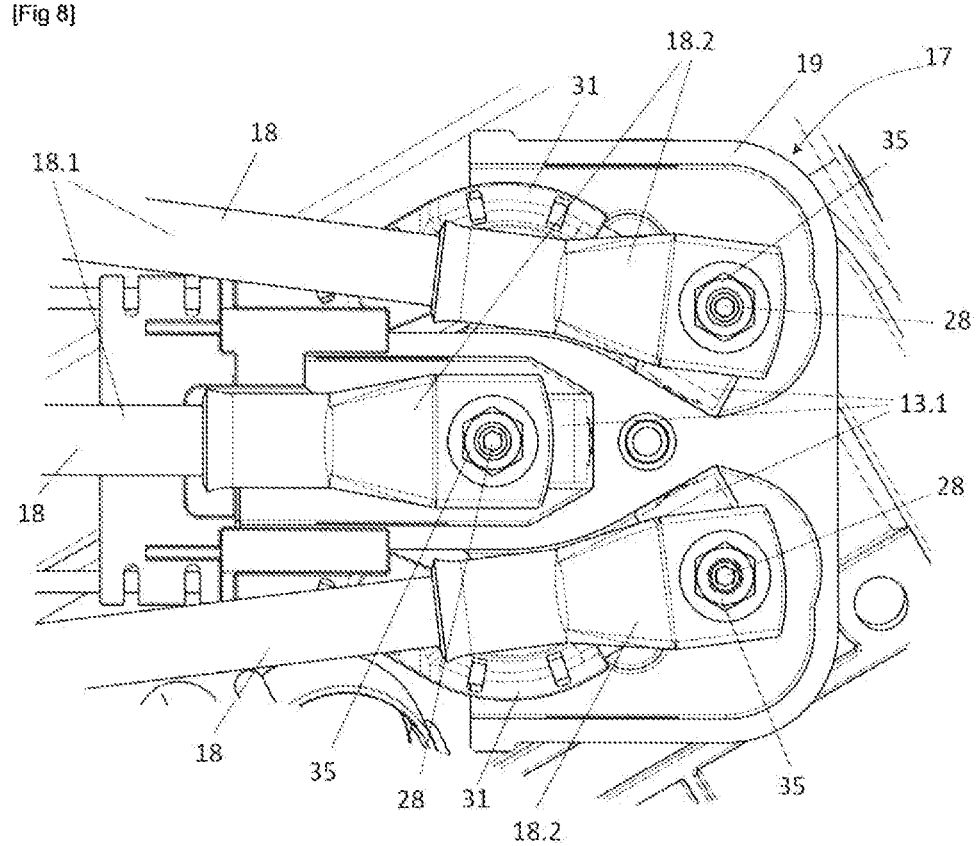

SCROLL COMPRESSOR INCLUDING AN ELECTRICAL BOX CONTAINING A WIRE GUIDING PART

CROSS-REFERENCE TO RELATED APPLICATION

This application claims foreign priority benefits under 35 U.S.C. § 119 to French Patent Application No. 21/02215 filed on Mar. 8, 2021, the content of which is hereby incorporated by reference in its entirety.

TECHNICAL FIELD

The present invention relates to a scroll compressor, and in particular to a scroll refrigeration compressor.

BACKGROUND

As known, a scroll compressor includes a hermetic casing; a compression unit arranged within the hermetic casing and including a first scroll and a second scroll; an electric motor arranged within the hermetic casing and configured to drive the second scroll relative to the first scroll; an electrical box attached to an outer surface of the hermetic casing; and compressor power terminals insulated from the hermetic casing and electrically connected to the electric motor, the compressor power terminals protruding in the electrical box.

The electrical box particularly contains a control module which is configured to control the electric motor, control wires which are connected to the control module, and a terminal block which is configured to electrically connect the compressor power terminals and the control wires to external power leads of an external power source. The terminal block allows to electrically connect each compressor power terminal with a respective control wire and a respective external power lead by means of common threaded bolt screwed into a threaded insert provided on the terminal block.

As known, the control wires are molded in a flexible assembly part configured to be attached to the terminal block. However, as the control wires are extending from the flexible assembly part, the position of the control wires and their eyelets has to be manually adjusted in relation to the compressor power terminals and the positions of the threaded inserts in the terminal block during the connection of the external power leads onto the terminal block.

Consequently, the connection of the external power leads onto the terminal block is difficult and mounting errors may occur.

SUMMARY

It is an object of the present invention to provide an improved scroll compressor which can overcome the drawbacks encountered in conventional scroll compressors.

Particularly, an object of the present invention is to provide a scroll compressor having a terminal block assembly which allows easier and more secure electrical connection between control wires and external power leads inside an electrical box containing the terminal block assembly.

According to the invention such a scroll compressor includes a hermetic casing, a compression unit arranged within the hermetic casing and including a first scroll and a second scroll, an electric motor arranged within the hermetic casing and configured to drive the second scroll relative to the first scroll, an electrical box attached to an outer surface of the hermetic casing, and compressor power terminals insulated from the hermetic casing and electrically connected to the electric motor, the compressor power terminals protruding in the electrical box, the electrical box containing a control module which is configured to control the electric motor, control wires which are connected to the control module, and a terminal block assembly configured to electrically connect the compressor power terminals and the control wires to external power leads of an external power source, wherein the terminal block assembly comprises a body part and a wire guiding part which is configured to guide and position the control wires in predetermined connection positions with respect to the body part.

Such a configuration of the terminal block assembly ensures a proper positioning of the control wires with respect to the body part, and particularly keeps the control wires in their predetermined connection positions, which ease and secure the electrical connection between the control wires and the external power leads inside an electrical box.

The scroll compressor may also include one or more of the following features, taken alone or in combination.

According to an embodiment of the invention, the control wires include two lateral control wires and a central control wire which is located between the two lateral control wires at the terminal block assembly.

According to an embodiment of the invention, at the terminal block assembly, the lateral control wires are arranged symmetrically with respect to a median longitudinal plane of the terminal block assembly.

According to an embodiment of the invention, an end portion of each of the lateral control wires extends with an angle of about 90 degrees to an extension axis of a bended connecting portion of the respective compressor power terminal.

According to an embodiment of the invention, the wire guiding part is configured to bend the lateral control wires such that each of the lateral control wire includes a curved wire portion.

According to an embodiment of the invention, the wire guiding part includes two lateral guiding members, for example two lateral guiding arms, each configured to bend the respective lateral control wire.

According to an embodiment of the invention, the wire guiding part includes reinforcing portions located between the central control wire and the two lateral control wires. Such a configuration of the wire guiding part further avoids movement of the lateral control wires with respect to the central control wire. Hereby, any excessive bending of the control wires during mounting and correct angular positioning of the control wires in relation to the compressor power terminals are ensured.

According to an embodiment of the invention, each of the reinforcing portions is substantially flat.

According to an embodiment of the invention, each of the control wires comprises an elongated main wire part and an eyelet crimped to an end portion of the respective elongated main wire part, the wire guiding part which being configured to position the eyelets of the control wires in the predetermined connection positions According to an embodiment of the invention, the eyelet of each control wire extends below the bended connecting portion of the respective compressor power terminal, and particularly along a lower surface of the respective bended connecting portion.

According to the embodiment shown on the figures, each lateral guiding member includes a free end which is located close to the eyelet of the respective lateral control wire.

According to an embodiment of the invention, each compressor power terminal comprises an aperture, e.g. an oblong aperture, which is facing the eyelet of a respective control wire.

According to an embodiment of the invention, each aperture is provided on the bended connecting portion of the respective compressor power terminal.

According to an embodiment of the invention, the terminal block assembly comprises metal inserts, e.g. brass inserts, secured to the body part and each having a central bore provided with a treaded inner surface, the terminal block assembly further including metal connection studs each having a treaded outer surface and each being mounted and secured in the central bore of a respective metal insert.

According to an embodiment of the invention, the eyelet of each control wire is facing the central bore of a respective metal insert and each metal connection stud extends through the eyelet of a respective control wire.

According to an embodiment of the invention, each metal connection stud extends substantially perpendicular to a bottom portion of the body part.

According to an embodiment of the invention, each metal connection stud extends through the aperture of a respective compressor power terminal.

According to an embodiment of the invention, the body part includes recesses each located at a position close to a respective metal connection stud, each recess being configured to accommodate a crimp connection between the eyelet and the elongated main wire part of a respective control wire, after mounting and securing of the external power leads. The connection lugs of the external power leads cause a pressing force on the control wires towards a bottom portion of the body part. The recesses avoid deformation of the crimp connections and the terminal block assembly.

According to an embodiment of the invention, the terminal block assembly includes locking nuts each secured to a respective metal connection stud, each locking nut being configured to secure an electrical connection between a respective compressor power terminal, a respective control wire and a respective external power lead.

According to an embodiment of the invention, each locking nut comprises a locking nut part and a conically shaped washer being rotatably and non-removably connected with the respective locking nut part.

According to an embodiment of the invention, the body part comprises a bottom portion provided with passage openings, each of the compressor power terminals extending through a respective passage opening.

According to an embodiment of the invention, the bottom portion of the body part comprises the recesses.

According to an embodiment of the invention, the metal inserts are secured to the bottom portion of the body part.

According to an embodiment of the invention, the body part comprises separating walls which protrude from the bottom portion and which define receiving spaces separated from each other, each passage opening emerging in a respective receiving space and each compressor power terminal protruding in a respective receiving space.

According to an embodiment of the invention, each central bore emerges in a respective receiving space.

According to an embodiment of the invention, each compressor power terminal is spade-shaped.

According to an embodiment of the invention, each of the external power leads comprises an elongated power lead part and a connection lug secured to, and for example crimped or welded to, an end portion of the respective elongated power lead part.

According to an embodiment of the invention, each connection lug includes a passage orifice through which extends a respective metal connection stud.

According to an embodiment of the invention, the wire guiding part and the body part are made as separate parts, and the wire guiding part is secured to the body part. The wire guiding part may be secured to the body part by a snap arrangement. However, it is also possible to manufacture the body part and the wire guiding part as an integral component.

According to an embodiment of the invention, the wire guiding part includes a central mounting portion on which is mounted the body part. Advantageously, the lateral guiding members extend from the central mounting portion.

According to an embodiment of the invention, the wire guiding part is a poka-yoke type component, so that the wire guiding part and the body part define only a single mounting configuration.

According to an embodiment of the invention, the control wires are molded together with the wire guiding part.

According to an embodiment of the invention, the control wires are smoothly guided along substantially their entire extension within the terminal block assembly.

According to an embodiment of the invention, the body part and the wire guiding part are both manufactured by molding polymer material.

According to an embodiment of the invention, the body part has substantially a T-shape.

The present invention also relates to a method for electrically connecting a terminal block assembly of a scroll compressor according to the invention to compressor power terminals, the method including the following steps:

attaching a bottom part of the electrical box to the hermetic casing, positioning the terminal block assembly including the wire guiding part onto the compressor power terminals, so that the compressor power terminals are aligned with and inserted through the passage openings provided on the bottom portion of the body part, bending the compressor power terminals about 90 degrees, so that end portions thereof extend substantially parallelly with the bottom portion of the body part, and so that apertures thereof are aligned with eyelets of the control wires and with the central bores of the metal inserts, screwing and fixing the metal connection studs into the metal inserts, mounting the locking nuts on the metal connection studs.

The present invention further relates to a method for electrically connecting a terminal block assembly of a scroll compressor according to the invention to external power leads of an external power source, the method including the following steps:

inserting external power leads of the external power source into the electrical box, temporarily removing the locking nuts, positioning connection lugs of the external power leads onto the metal connection studs, re-attaching the locking nuts to the metal connection studs in order to secure connection of eyelets of the control wires, the compressor power terminals and the connection lugs of the external power leads.

BRIEF DESCRIPTION OF THE DRAWINGS

The following detailed description of an embodiment of the invention is better understood when read in conjunction with the appended drawings being understood, however, that the invention is not limited to the specific embodiment disclosed.

FIG. 1 is a longitudinal cross-section view of a scroll compressor according to a first embodiment of the invention.

FIG. 2 is a perspective view of an electrical box of the scroll compressor of FIG. 1.

FIG. 3 is a top view of a terminal block assembly of the scroll compressor according of FIG. 1.

FIG. 4 is a perspective view of a body part of the terminal block assembly of FIG. 3.

FIG. 5 is a top view of a wire guiding part of the terminal block assembly of FIG. 3.

FIG. 6 is a partial longitudinal cross-section view of the scroll compressor of FIG. 1.

FIG. 7 is enlarged view of a detail of FIG. 6.

FIG. 8 is a top view of the terminal block assembly of FIG. 3 electrically connected to external power leads.

DETAILED DESCRIPTION

FIG. 1 describes a scroll compressor 1 according to an embodiment of the invention.

The scroll compressor 1 includes a hermetic casing 2 provided with a suction inlet 3 configured to supply the scroll compressor 1 with refrigerant gas to be compressed, and with a discharge outlet 4 configured to discharge compressed refrigerant gas.

The scroll compressor 1 further includes a support arrangement 5 fixed to the hermetic casing 2, and a compression unit 6 disposed inside the hermetic casing 2 and supported by the support arrangement 5. The compression unit 6 is configured to compress the refrigerant gas supplied by the suction inlet 3.

According to the embodiment shown on the figures, the compression unit 6 includes a first scroll 7, which is fixed in relation to the hermetic casing 2, and a second scroll 8 which is supported by and in slidable contact with an upper thrust bearing surface 9 provided on the support arrangement 5. The second scroll 8 is configured to perform an orbiting movement relative to the first scroll 7 during operation of the scroll compressor 1.

Furthermore, the scroll compressor 1 includes a drive shaft 11 which is vertically orientated and which is configured to drive the second scroll 8 in an orbital movement, and an electric motor 12 arranged within the hermetic casing 2 and coupled to the drive shaft 11. The electric motor 12 is configured to drive in rotation the drive shaft 11 about a rotation axis A.

The scroll compressor 1 further includes compressor power terminals 13 insulated from the hermetic casing 2 and electrically connected to the electric motor 12.

The scroll compressor 1 also includes an electrical box 14 attached to an outer surface of the hermetic casing 2. The compressor power terminals 13 particularly protrude in the electrical box 14.

As better shown on FIG. 2, the electrical box 14 contains a control module 15 which is configured to control the electric motor 12, and control wires 16, for example three control wires 16, which are connected to the control module 15. Advantageously, each of the control wires 16 comprises an elongated main wire part 16.1 and an eyelet 16.2 crimped to an end portion of the respective elongated main wire part 16.1.

The electrical box 14 further contains a terminal block assembly 17 configured to electrically connect the compressor power terminals 13 and the control wires 16 to external power leads 18 of an external power source. Generally, each of the external power leads 18 comprises an elongated power lead part 18.1 and a connection lug 18.2 secured to, and for example crimped or welded to, an end portion of the respective elongated power lead part 18.1.

According to the embodiment shown on the figures, the control wires 16 include two lateral control wires 16A and a central control wire 16B which is located between the two lateral control wires 16A at the terminal block assembly 17.

The terminal block assembly 17 comprises a body part 19, which has for example substantially a T-shape, and a wire guiding part 21. The body part 19 and the wire guiding part 21 are made in insulating material, and advantageously are both manufactured by molding polymer material. The control wires 16 may for example be molded together with the wire guiding part 21.

According to the embodiment shown on the figures, the wire guiding part 21 and the body part 19 are made as separate parts, and the wire guiding part 21 is secured to the body part 19 for example by a snap arrangement. Advantageously, the wire guiding part 21 is a poka-yoke type component, so that the wire guiding part 21 and the body part 19 define only a single mounting configuration. However, it is also possible to manufacture the body part 19 and the wire guiding part 21 as an integral component.

The body part 19 comprises a bottom portion 22 provided with passage openings 23 through each of which extends a respective compressor power terminal 13. Each passage opening 23 may for example have a rectangular cross section and the passage openings 23 may for example be regularly angularly distributed around a central axis B.

The body part 19 further comprises separating walls 24 which protrude from the bottom portion 22 and which define receiving spaces 25 separated from each other. Each passage opening 23 emerges in a respective receiving space 25 such that each compressor power terminal 13 protrudes in a respective receiving space 25.

According to the embodiment shown on the figures, the terminal block assembly 17 comprises metal inserts 26, e.g. brass inserts, secured to the bottom portion 22 of the body part 19 and each having a central bore 27 which emerges in a respective receiving space 25 and which is provided with a treaded inner surface, and further comprises metal connection studs 28 each having a treaded outer surface and each being mounted and secured in the central bore 27 of a respective metal insert 26. The metal inserts 26 may for example be regularly angularly distributed around the central axis B, and each metal insert 26 is advantageously located close to a respective passage opening 23.

According to the embodiment shown on the figures, each compressor power terminal 13 comprises a bended connecting portion 13.1 provided with an aperture 13.2, e.g. an oblong aperture, which is facing the central bore 27 of a respective metal inserts 26. Advantageously, each metal connection stud 28 extends perpendicular to the bottom portion 22 of the body part 19 and extends through the eyelet 16.2 of a respective control wire 16 and through the aperture 13.2 of a respective compressor power terminal 13. Advantageously, each metal connection stud 28 is configured to extend through a passage orifice provided on a connection lug 18.2 of a respective external power lead 18.

As better shown on FIGS. 3 and 5, the wire guiding part 21 is configured to smoothly guide the control wires 16 along substantially their entire extension within the wire guiding part 21. The wire guiding part 21 is also configured to position the eyelets 16.2 of the control wires 16 in predetermined connection positions with respect to the body part 19, such that each eyelet 16.2 is facing the central bore 27 of a respective metal insert 26 and is also facing the aperture 13.2 of a respective compressor power terminal 13. Advantageously, the eyelet 16.2 of each control wire 16 extends below the bended connecting portion 13.1 of the respective compressor power terminal 13, and particularly along a lower surface of the respective bended connecting portion 13.1, and are interposed between the respective metal insert 26 and the respective bended connecting portion 13.1.

According to the embodiment shown on the figures, the wire guiding part 21 includes a central guiding portion 29 configured to guide the central control wire 16B, and two lateral guiding members 31, for example two lateral guiding arms, each configured to guide a respective lateral control wire 16A. The two lateral guiding members 31 are located on either side of the central guiding portion 29 and extend from the central guiding portion 29. Each lateral guiding member 31 is particularly configured to bend the respective lateral control wire 16A such that each of the lateral control wire 16A includes a curved wire portion. Advantageously, the lateral guiding members 31 are configured such that each an end portion of each of the lateral control wires 16A extends with an angle of about 90 degrees to an extension axis of the bended connecting portion 13.1 of the respective compressor power terminal 13, and such that the lateral control wires 16A are arranged symmetrically with respect to a median longitudinal plan of the terminal block assembly 17.

According to the embodiment shown on the figures, each lateral guiding member 31 includes a free end 31.1 which is located close to the eyelet 16.2 of the respective lateral control wire 16A.

Furthermore, the wire guiding part 21 includes two reinforcing portions 32 which are for example substantially flat. Each reinforcing portion 32 is located between the central control wire 16B and a respective lateral guiding member 31. Such a configuration of the wire guiding part 21 further avoids movement of the lateral control wires 16A with respect to the central control wire 16B. Hereby, any excessive bending of the control wires 16 during mounting and correct angular positioning of the control wires 16 in relation to the compressor power terminals 13 are ensured. Advantageously, each reinforcing portion 32 extend from an inner surface of the respective lateral guiding member 31.

In addition, the wire guiding part 21 includes a mounting housing 33 in which is partially mounted the body part 19 and is secured the body part 19. Advantageously, the mounting housing 33 is defined at least partially by two lateral walls 34 protruding from the central guiding portion 29.

The terminal block assembly 17 includes locking nuts 35 each secured to a respective metal connection stud 28, each locking nut 35 being configured to secure an electrical connection between a respective compressor power terminal 13, a respective control wire 16 and a respective external power lead 18. Advantageously, each locking nut 35 comprises a locking nut part 35.1 and a conically shaped washer 35.2 being rotatably and non-removably connected with the respective locking nut part 35.1.

The body part 19 further includes recesses 36 provided on the bottom portion 22 and each located at a position close to a respective metal connection stud 28. Each recess 36 is configured to accommodate, after mounting and securing of the external power leads 18, a crimp connection between the eyelet 16.2 and the elongated main wire part 16.1 of a respective control wire 16. The connection lugs 18.2 of the external power leads 18 cause a pressing force on the control wires 16 towards a bottom portion 22 of the body part 19. The recesses 36 avoid deformation of the crimp connections and the terminal block assembly 17.

A method for electrically connecting the terminal block assembly 17 to the compressor power terminals 13 includes the following steps:
- attaching a bottom part 14.1 of the electrical box 14 to the hermetic casing 2, e.g. by threaded bolts or welding,
- positioning the terminal block assembly 17 including the wire guiding part 21 onto the compressor power terminals 13, so that the compressor power terminals 13 are aligned with and inserted through the passage openings 23 provided on the bottom portion 22 of the body part 19,
- bending the compressor power terminals 13 about 90 degrees, so that their end portions extend parallelly with the bottom portion 22 of the body part 19, and their apertures 13.2 are aligned with the eyelets 16.2 of the control wires 16 and the central bores 27 of the metal inserts 26,
- screwing and fixing the metal connection studs 28 into the metal inserts 26,
- mounting the locking nuts 35 on the metal connection studs 28.

A method for electrically connecting the terminal block assembly 17 to external power leads 18 of an external power source (when installing the scroll compressor 1 at its place of operation) includes the following steps:
- inserting external power leads 18 of the external power source into the electrical box 14,
- temporarily removing the locking nuts 35,
- positioning the connection lugs 18.2 of the external power leads 18 onto the metal connection studs 28,
- re-attaching the locking nuts 35 to the metal connection studs 28 in order to secure connection of the eyelets 16.2 of the control wires 16, the compressor power terminals 13 and the connection lugs 18.2 of the external power leads 18.

Of course, the invention is not restricted to the embodiment described above by way of non-limiting example, but on the contrary it encompasses all embodiments thereof.

What is claimed is:

1. A scroll compressor including a hermetic casing, a compression unit arranged within the hermetic casing and including a first scroll and a second scroll, an electric motor arranged within the hermetic casing and configured to drive the second scroll relative to the first scroll, an electrical box attached to an outer surface of the hermetic casing, and compressor power terminals insulated from the hermetic casing and electrically connected to the electric motor, the compressor power terminals protruding in the electrical box, the electrical box containing a control module which is configured to control the electric motor, control wires which are connected to the control module, and a terminal block assembly configured to electrically connect the compressor power terminals and the control wires to external power leads of an external power source, wherein the terminal block assembly comprises a body part and a wire guiding part which is configured to guide and position the control wires in predetermined connection positions with respect to the body part.

2. The scroll compressor according to claim 1, wherein the control wires include two lateral control wires and a central control wire which is located between the two lateral control wires at the terminal block assembly.

3. The scroll compressor according to claim 2, wherein an end portion of each of the lateral control wires extends with an angle of about 90 degrees to an extension axis of a bended connecting portion of the respective compressor power terminal.

4. The scroll compressor according to claim 2, wherein the wire guiding part is configured to bend the lateral control wires such that each of the lateral control wire includes a curved wire portion.

5. The scroll compressor according to claim 2, wherein the wire guiding part includes reinforcing portions located between the central control wire and the two lateral control wires.

6. The scroll compressor according to claim 1, wherein each of the control wires comprises an elongated main wire part and an eyelet crimped to an end portion of the respective elongated main wire part, the wire guiding part which being configured to position the eyelets of the control wires in the predetermined connection positions.

7. The scroll compressor according to claim 6, wherein each compressor power terminal comprises an aperture which is facing the eyelet of a respective control wire.

8. The scroll compressor according to claim 7, wherein the terminal block assembly comprises metal inserts secured to the body part and each having a central bore provided with a treaded inner surface, the terminal block assembly further including metal connection studs each having a treaded outer surface and each being mounted and secured in the central bore of a respective metal insert.

9. The scroll compressor according to claim 8, wherein the eyelet of each control wire is facing the central bore of a respective metal insert and each metal connection stud extends through the eyelet of a respective control wire.

10. The scroll compressor according to claim 9, wherein the body part includes recesses each located at a position close to a respective metal connection stud, each recess being configured to accommodate a crimp connection between the eyelet and the elongated main wire part of a respective control wire, after mounting and securing of the external power leads.

11. The scroll compressor according to claim 8, wherein the terminal block assembly includes locking nuts each secured to a respective metal connection stud, each locking nut being configured to secure an electrical connection between a respective compressor power terminal, a respective control wire and a respective external power lead.

12. The scroll compressor according to claim 1, wherein the body part comprises a bottom portion provided with passage openings, each of the compressor power terminals extending through a respective passage opening.

13. The scroll compressor according to claim 12, wherein the body part comprises separating walls which protrude from the bottom portion and which define receiving spaces separated from each other, each passage opening emerging in a respective receiving space and each compressor power terminal protruding in a respective receiving space.

14. The scroll compressor according to claim 1, wherein the wire guiding part and the body part are made as separate parts, and the wire guiding part is secured to the body part.

15. The scroll compressor according to claim 14, wherein the wire guiding part is a poka-yoke type component, so that the wire guiding part and the body part define only a single mounting configuration.

16. The scroll compressor according to claim 1, wherein the control wires are molded together with the wire guiding part.

17. The scroll compressor according to claim 1, wherein the control wires are smoothly guided along substantially their entire extension within the terminal block assembly.

18. The scroll compressor according to claim 1, wherein the body part and the wire guiding part are both manufactured by molding polymer material.

19. A method for electrically connecting a terminal block assembly of a scroll compressor to compressor power terminals, the scroll compressor including a hermetic casing, a compression unit arranged within the hermetic casing and including a first scroll and a second scroll, an electric motor arranged within the hermetic casing and configured to drive the second scroll relative to the first scroll, an electrical box attached to an outer surface of the hermetic casing, and compressor power terminals insulated from the hermetic casing and electrically connected to the electric motor, the compressor power terminals protruding in the electrical box, the electrical box containing a control module which is configured to control the electric motor, control wires which are connected to the control module, and a terminal block assembly configured to electrically connect the compressor power terminals and the control wires to external power leads of an external power source, wherein the terminal block assembly comprises a body part and a wire guiding part which is configured to guide and position the control wires in predetermined connection positions with respect to the body part, wherein each of the control wires comprises an elongated main wire part and an eyelet crimped to an end portion of the respective elongated main wire part, the wire guiding part which being configured to position the eyelets of the control wires in the predetermined connection positions, wherein each compressor power terminal comprises an aperture which is facing the eyelet of a respective control wire, wherein the terminal block assembly comprises metal inserts secured to the body part and each having a central bore provided with a treaded inner surface, the terminal block assembly further including metal connection studs each having a treaded outer surface and each being mounted and secured in the central bore of a respective metal insert, wherein the terminal block assembly includes locking nuts each secured to a respective metal connection stud, each locking nut being configured to secure an electrical connection between a respective compressor power terminal, a respective control wire and a respective external power lead, wherein the body part comprises a bottom portion provided with passage openings, each of the compressor power terminals extending through a respective passage opening, the method comprising the following steps:

attaching a bottom part of the electrical box to the hermetic casing, positioning the terminal block assembly including the wire guiding part onto the compressor power terminals, so that the compressor power terminals are aligned with and inserted through the passage openings provided on the bottom portion of the body part, bending the compressor power terminals about 90 degrees, so that end portions thereof extend substantially parallelly with the bottom portion of the body part, and so that apertures thereof are aligned with eyelets of the control wires and with the central bores of the metal inserts, screwing and fixing the metal connection studs into the metal inserts, mounting the locking nuts on the metal connection studs.

20. A method for electrically connecting a terminal block assembly of a scroll compressor to external power leads of an external power source, the scroll compressor including a hermetic casing, a compression unit arranged within the hermetic casing and including a first scroll and a second scroll, an electric motor arranged within the hermetic casing and configured to drive the second scroll relative to the first scroll, an electrical box attached to an outer surface of the hermetic casing, and compressor power terminals insulated from the hermetic casing and electrically connected to the electric motor, the compressor power terminals protruding in the electrical box, the electrical box containing a control module which is configured to control the electric motor, control wires which are connected to the control module, and a terminal block assembly configured to electrically connect the compressor power terminals and the control wires to external power leads of an external power source, wherein the terminal block assembly comprises a body part and a wire guiding part which is configured to guide and position the control wires in predetermined connection positions with respect to the body part, wherein each of the control wires comprises an elongated main wire part and an eyelet crimped to an end portion of the respective elongated main wire part, the wire guiding part which being configured to position the eyelets of the control wires in the predetermined connection positions, wherein each compressor power terminal comprises an aperture which is facing the eyelet of a respective control wire, wherein the terminal block assembly comprises metal inserts secured to the body part and each having a central bore provided with a treaded inner surface, the terminal block assembly further including metal connection studs each having a treaded outer surface and each being mounted and secured in the central bore of a respective metal insert, wherein the terminal block assembly includes locking nuts each secured to a respective metal connection stud, each locking nut being configured to secure an electrical connection between a respective compressor power terminal, a respective control wire and a respective external power lead, the method comprising the following steps:
inserting external power leads of the external power source into the electrical box,
temporarily removing the locking nuts,
positioning connection lugs of the external power leads onto the metal connection studs,
re-attaching the locking nuts to the metal connection studs in order to secure connection of eyelets of the control wires, the compressor power terminals and the connection lugs of the external power leads.

21. The scroll compressor according to claim 1, wherein the control wires include two lateral control wires and a central control wire which is located between the two lateral control wires at the terminal block assembly, wherein the wire guiding part includes two lateral guiding members, each configured to bend the respective lateral control wire, wherein each of the control wires comprises an elongated main wire part and an eyelet crimped to an end portion of the respective elongated main wire part, and wherein each lateral guiding member includes a free end.

22. The scroll compressor according to claim 1, wherein the control wires include two lateral control wires and a central control wire which is located between the two lateral control wires at the terminal block assembly, wherein the wire guiding part includes two lateral guiding members, each configured to bend the respective lateral control wire, and wherein each lateral guiding member includes a free end.

* * * * *